US008334753B2

(12) United States Patent
Herwats

(10) Patent No.: US 8,334,753 B2
(45) Date of Patent: Dec. 18, 2012

(54) METHOD AND SYSTEM FOR IDENTIFYING AND HANDLING (TRACING/LOCATING/IDENTIFYING TO RECEIVE SERVICES) AN OWNER AND ITEMS IN A SECURE/PRIVATE AREA

(75) Inventor: Béatrice Marie Jacqueline Herwats, Overijse (BE)

(73) Assignee: Senthis BVBA, Overijse (BE)

( * ) Notice: Subject to any disclaimer, the term of this patent is extended or adjusted under 35 U.S.C. 154(b) by 888 days.

(21) Appl. No.: 12/224,164

(22) PCT Filed: Feb. 16, 2007

(86) PCT No.: PCT/EP2007/001366

§ 371 (c)(1),
(2), (4) Date: Oct. 22, 2008

(87) PCT Pub. No.: WO2007/096097

PCT Pub. Date: Aug. 30, 2007

(65) Prior Publication Data

US 2009/0219169 A1 Sep. 3, 2009

(30) Foreign Application Priority Data

Feb. 20, 2006 (EP) .................................... 06075395

(51) Int. Cl.
*H04Q 5/22* (2006.01)
*G08B 13/14* (2006.01)
*G05B 19/00* (2006.01)

(52) U.S. Cl. ..................... 340/10.1; 340/572.1; 340/5.6; 340/568; 340/10.51; 340/573.1

(58) Field of Classification Search ............... 340/572.1, 340/10.1, 572, 568, 10.51, 573.1, 5.2, 5.8, 340/5.81
See application file for complete search history.

(56) References Cited

U.S. PATENT DOCUMENTS 5,512,879 A 4/1996 Stokes
5,650,768 A * 7/1997 Eswaran .................... 340/572.1
5,886,634 A * 3/1999 Muhme ...................... 340/572.1
6,144,304 A 11/2000 Webb
6,300,872 B1 * 10/2001 Mathias et al. ............... 340/540
6,873,260 B2 * 3/2005 Lancos et al. .............. 340/573.1
6,977,586 B2 * 12/2005 Martin et al. ............ 340/539.15
7,002,451 B2 * 2/2006 Freeman .................... 340/10.51

(Continued)

FOREIGN PATENT DOCUMENTS

EP 0 372 716 6/1990

(Continued)

*Primary Examiner* — Daniel Wu
*Assistant Examiner* — Mancil Littlejohn
(74) *Attorney, Agent, or Firm* — Bacon & Thomas, PLLC

(57) ABSTRACT

To securely handle (trace/locate/identify to receive services) of an owner and items within a secure/private area, the owner is identified (101) through owner identification means, and the items are identified (101) through reusable item identification means securely fixed to the items. A link between the owner and the items is maintained in a database, and this link is activated (103) for instance through automated/semi-automated registration of the owner upon entrance of the secure/private area (104). The owner and items are handled (traced/located/identified to receive services) (105) during a transaction or event in the secure/private area to facilitate controlling the item during the transaction or event. Optionally, the items are secured (106) in the secure/private area by monitoring departure from the secure/private area via an intelligent gate that senses owner and item identification means within a predetermined, restrictive distance from the intelligent gate.

17 Claims, 4 Drawing Sheets

U.S. PATENT DOCUMENTS

2002/0082859 A1 6/2002 Lancos et al.
2004/0022227 A1 * 2/2004 Lynch et al. .................. 370/338
2004/0080419 A1 4/2004 Martin et al.
2005/0168340 A1 8/2005 Mosher, Jr. et al.

FOREIGN PATENT DOCUMENTS

GB 2 387 744 10/2003

* cited by examiner

METHOD AND SYSTEM FOR IDENTIFYING AND HANDLING (TRACING/LOCATING/IDENTIFYING TO RECEIVE SERVICES) AN OWNER AND ITEMS IN A SECURE/PRIVATE AREA

FIELD OF THE INVENTION

The present invention generally relates to identification and handling (tracing/locating/identifying to receive services) of an owner and item(s) in a secure/private area, such as for instance a traveller and baggage(s) in an airport, a guest and article(s) of clothing in a cloakroom, an employee and a PC or other office belonging(s) like file(s) in an office building, a library subscriber and book(s) in a library, an art collector and artwork(s) in a museum or housing where the artwork(s) are kept, a parent and child(ren) in an amusement park, airport, theatre, hotel etc. In the context of this patent application, "owner" thus covers any person who has a certain link and responsibility to the item and who is authorized to handle the item(s) at least within the secure/private area. The ownership is reflected through a link between the owner and one or several items, and the link is kept within a database. "Item" in the context of this patent application must be interpreted broadly as potentially being any object or individual for which the associated "owner" has a certain responsibility. An "item" in the context of this invention will be exposed to an open transaction in the secure/private area, but is assumed under no condition to leave the secure/private area without its "owner" or without being authorized to do so. The invention aims at handling (tracing/locating/identifying to receive services) the item during the open transaction, thereby facilitating control and processing of the items with increased efficiency.

BACKGROUND OF THE INVENTION

Various systems for identifying and tracing/locating individuals and/or items within a specific area or location are described in the state of the art literature, but all of them are restricted in applicability and fail to teach securing the items within the secure/private area. Further, all existing systems suffer from one or more of the following disadvantages: inability to create a link between owner and item(s) outside the coverage area, inability to handle (trace/locate/identify to receive services) items during an open transaction, static link between the owner and item(s) typically maintained through inventory, automated or semi-automated registration/activation capabilities are missing, inability to trace and control the processing of items, no secure fixing of item identities, reusability is inexistent or very limited, e.g. static reusability without the ability to adapt information. A handful of prior art solutions is described below, and their shortcomings are summarized.

United States Patent Application US 2005/0168340 A1 describes a method for determining the identity and monitoring the location of a passenger and his/her baggage in an airport. An instance of the method is for instance illustrated by FIG. 38, and described in detail on page 14, paragraph [0108]. Therein, the passenger obtains an identification appliance such as an identification band. For the baggage, a bag identification band is created and both identification bands are activated upon check-in. The bag identification band identifies both the baggage and its owner, hence linking the baggage to the passenger. Band readers and sensors placed at various locations in the airport area track the whereabouts of passenger and baggage. The band readers and sensors are connected to a central computer system that maintains information about the passengers and their baggage. When claiming the baggage at the bag band in the destination arrival terminal, the identification appliance of the passenger and bag must match. The identification appliances for passenger and baggage are deactivated upon completion of the travel event.

The method disclosed in US 2005/0168340 A1 does not secure the bags within the airport area. A bag that is stolen after being claimed by its owner, can be taken outside the airport area by the stealer of the baggage. Another drawback is that the identification bands for traveller and bag are not reusable. They are activated at check-in and deactivated upon completion of the travel event, and are not reusable during later travel events. Also, US 2005/0168340 A1 does not teach how to securely fix the bag bands to the baggage. Without secure fixing, the bag band can be removed and/or replaced, and it can be used on other bags for fraudulent purposes such as theft, smuggling, terrorist acts, etc. The system disclosed in US 2005/0168340 A1 is limited in applicability to transportation such as airplane, train, boat, bus or other vehicle travelling, and restricted to determining the identity and location. Handling (tracing/locating/identifying to receive services) items during a transaction and controlling the processing is not possible.

U.S. Pat. No. 6,300,872 discloses a system for identifying items and individuals in a secured location and for prohibiting the removal of secured items from the secured location, except for authorized individuals. The system is based on transponders that can be sensed from a distance to identify both the items and the individuals. Detectors that sense the transponders, typically positioned at the entrance and/or exit of the secured location, are connected to a reasoning system that enforces certain security rules and generates alerts for security personnel in case the security rules are violated.

The system known from U.S. Pat. No. 6,300,872 is limited in functionality. Firstly, it does not trace events or transactions of the items and individuals in the secured/private location, and certainly does not enable controlling or facilitating the processing of items during a transaction. The system prohibits removal of secured items from the secured location through a complex reasoning system based on security rules and processes, feedback from security personnel regarding efficiency of the security rules and a learning system that updates or creates new rules in conformance with the feedback of security personnel. U.S. Pat. No. 6,300,872 further does not teach secure fixing of the transponders to the items, hence enabling removal and replacement of transponders for fraudulent purposes. Lastly, there is no automated or semi-automated activation/de-activation of the transponders identifying the individuals and items, and it is not clear whether the transponders are reusable inside or outside the secured location.

U.S. Pat. No. 5,886,634 entitled "Item Removal System and Method" describes a security system for prevention of unauthorized removal of items from an organizations' facilities. Items like laptop computers are tagged with a first tag, preferably securely attached. Employees are carrying a second tag, e.g. integrated in their employee badge. A database maintains information that associates items with employees, and an intelligent gate, door or turnstile locks automatically to prevent. removal of an item by a person who is not authorized to remove the item. U.S. Pat. No. 5,886,634 however does not deal with tracing, locating and/or identifying an owner and items to receive services—the security system disclosed therein is limited to theft prevention of items in organizations' facilities—and it does not suggest to tag items with reusable tags, to remotely register the owner of items, to enable the owner to activate the link with the reusable item tags, and to facilitate handling and controlling the owner and items during a transaction.

U.S. Pat. No. 6,873,260 and corresponding Patent Application US 2002/082859A1 entitled "System and Method for Selectively Allowing the Passage of a Guest Through a Region Within a Coverage Area" describe a method for tracing guests within a coverage area through RFID tags worn by the guests. The coverage area can be an amusement park, ski resort, hotel, theatre, cruise ship, fair, etc. as is indicated in column 2, lines 39-44 of U.S. Pat. No. 6,873,260. The RFID tags are obtained and activated at check-in from an operator that manually checks-in the guest. The check-in process is described in column 3, line 55-column 4, line 6 of U.S. Pat. No. 6,873,260. A guest data object is stored in a central server or database, and the data objects of several guests, e.g. adult and child, family members, a group of friends, a group of employees, etc., can be linked in the database. Within the coverage area, kiosks and points-of-sale (POS) with connectivity to the central server enable added-value services focused on sales within the amusement park but not supporting a process with transactions, like purchasing monetary credits (kiosk), facilitating monetary transactions (POS), reserving times for events, attractions and restaurants (kiosk), purchasing items (POS), and sharing messages with other guests (kiosk). Further, turnstile systems are located at the entrance/exit of the coverage area to prevent for instance children from leaving the coverage area unattended or with an unauthorized person.

The system of U.S. Pat. No. 6,873,260 is limited to tracing RFID tagged persons in the coverage area. It is not possible to trace items. It is not able to register an owner automatically or semi-automatically without intervention of an operator, and it is not able to create the link between an owner and an individual or item from outside the coverage area or from a remote location. This link is always created manually by a third-party involved, i.e. the operator at check-in. The system of U.S. Pat. No. 6,873,260 is not able to identify items outside the coverage area. At best, U.S. Pat. No. 6,873,260 suggests to use the ID no. written on the tag for downloading pictures taken in the secure area. The tag itself however cannot be used thereto and the ability to download pictures taken requires activation of this feature when the guest is in the park (see column 19, lines 27-45). Also, this system follows children within a specific area. It is not adapted to follow items or humans that are subject to a transaction (e.g. an automated or semi-automated process) wherein the owner/parent is given visibility and control on the transaction process. Thus, with the system of U.S. Pat. No. 6,873,260, items can get stolen and be taken outside the coverage area by persons that are not the owner of the item. Also, U.S. Pat. No. 6,873,260 fails to disclose secure tagging of the guests that are traced. The suggested bracelet, wrist band and pin of column 8, line 66 are all removable by a malicious person. Without secure tagging, the RFID tags can be removed, replaced, interchanged, or lost as a result of which guests have unauthorized access to services inside the coverage area and/or can leave the coverage area unattended. Further, the RFID tags are also not reusable in the system of U.S. Pat. No. 6,873,260. As is explicitly mentioned in column 8, line 55-column 9, line 3, the guests receive the identification tags at entrance of the coverage area. Receiving the identification tag is part of the entrance procedure and consequently happens each time the guest re-enters the secure park. The tags can be read (e.g. by the turnstile system) and can be written (e.g. at the entrance upon instruction by the operator, but the read/write property does not imply that a single tag is reusable by a guest during several passages through the amusement park or secure area. Further, although turnstile systems are described in U.S. Pat. No. 6,873,260, there is no reconciliation of data between the owner card and the item card in the turnstile systems to exit the area.

The system disclosed in U.S. Pat. No. 5,512,879 is limited to prevent infant kidnapping and mixups thanks to active tags. It is not able to prevent infant kidnapping and mixups thanks to passive tags. The Pauley device is also limited to use on a human being by teaching capacitive coupling as a means for determining the continuing proximity to human skin and is thus not suitable for protecting objects in addition to persons. It is not able to prevent infant kidnapping without a system based on skin or physical contact.

U.S. Pat. No. 6,144,304 describes another parent-infant identification system that is tailored to be used in health-care institutions like hospitals. The identity is kept in an electronically readable data button that is securely fixed to the ankle or wrist of for instance the infant through a bracelet. The data button further keeps matching data for linking the parent and infant. A data button reader is positioned for instance at the exit of the health-care institution and generates an error tone or other audible signal in case of mismatch between the parent- and child buttons.

The system known from U.S. Pat. No. 6,144,304 is restricted in applicability. It does not enable identification of items, dynamic linking of items to owners, and securing the items within the health-care institution or other secured area. The data buttons that serve as identification means for the parent and child cannot be reused, and there is no automated or semi-automated activation/registration process. This system clearly is not suited to trace items or humans during an open transaction whereby visibility and control on the process is granted to the owner.

European Patent Application EP 0 372 716 entitled "Article Removal Control System" describes another theft or removal prevention system able to authorize removal of an article, for instance a book from a library. Thereto, an article ID is securely attached to the articles and inventory is kept. The user has a reusable user ID but the reusability does not enable adaptation of the information contained. Although verification of the user ID and article ID is automated, the sensing and gantry control is not automated. Also, no services like web portal and messaging are disclosed, simply because the described system keeps inventory and does not enable tracing and controlling the items/books during a transaction or process.

It is an objective of the present invention to disclose a method and system for identifying and handling (tracing/locating/identifying to receive services) an owner and one or more items within a secure/private area, which overcomes the drawbacks and shortcomings of the prior art solutions identified above. In particular, it is an objective of the invention to enable identifying an object (or item) and eventually his owner in a reusable way as well as to identify the object(s) or item(s) in a secure way. It is also an objective to enable dynamic linking the owner and the item(s), the link being activated through an automated or semi-automated process and to trace/control/facilitate the processing of items during a handling process (tracing/locating/identifying to receive services). It is a further objective to provide a method and system that secures the item(s) within the secure/private area, unless the item(s) is/are accompanied by the owner.

SUMMARY OF THE INVENTION

The above defined objectives are achieved and the drawbacks of the prior art are overcome through a method for identifying and handling an owner and items within a secure/private area. This method includes at least the steps of:

a. identifying the owner through owner identification means;

b. identifying the item(s) through reusable item identification means;

c. securely fixing the item identification means to the item(s);

d. creating a database link between the owner and the item(s);

e. automatically or semi-automatically remotely registering at least the owner prior to entering the secure/private area;

f. automatically or semi-automatically activating by the owner the link between the owner and the item(s);

g. handling the owner and the item(s) during a transaction or event in the secure/private area; and h. facilitating controlling the at least one item during the transaction or event.

Thus, the innovation resides in the issuing of an owner ID, for instance on a master smartcard, and one or more item IDs, for instance a set of child or item cards linked to the master card. The master card containing the owner ID according to the current invention can be a dedicated card for products and services specific to a secure/private area, or it can be integrated with the cards or identification means used by that person for various other services, like a payment card, a frequent flyer card, an insurance card, an RFID passport, a biometric passport, a SIM card or mobile phone information, etc. At least the tags containing the item identification's data are reusable, and it is always possible to link additional item IDs during the lifetime of the master ID. Hence, a master ID can be linked to many item IDs. The item IDs are securely fixed to the items, implying that it is impossible to remove the item ID from the item without spoiling or damaging the item ID (this would for instance be the case if the item ID is integrated in the item like a tag that is incorporated in a luggage case during the manufacturing of the case), or without generating audible and or visible alarms (this would for instance be the case if the item ID forms part of an intelligent bracelet that produces an alarm when cut or damaged). The link between the owner ID and item IDs is automatically (i.e. without human intervention) or semi-automatically activated through a computerized registration or pre-registration process which can take place outside the secure/private area. This pre-registration or registration could for instance be done via a secured website, via a dedicated registration tool kept by a company or person that picks up the owner and/or items (e.g. luggage pick-up service at a hotel or at home), via a dedicated registration terminal at the entrance of the secure/private area, etc. The registration of the owner takes place prior to entering the secure/private area. The registration is completed remotely. Confirmation of the registration may be or may not be required upon entering the secure/private area. Typically, the registration will only be effective and the link between owner and items will become active when the owner accesses the secure/private area (eventually after confirming his registration). Thus, the database link between owner and item(s) will be activated upon confirmation of the pre-registration that has taken place outside the secure/private area, e.g. in a hotel, during the shuttle service to the secure/private area, etc. Depending on the application and deployment choices, once the owner and items have entered the secure/private area, the items are traced during events and transactions, thereby reducing the time for handling items through an improved, automated logistics process for the items.

Apart from resolving the above mentioned shortcomings of prior art solutions, the method for identifying and handling (tracing/locating/identifying to receive services) an owner and items according to the present invention is advantageous in that it enables additional services like automatically receiving messages on the transaction status of items, reducing the time for the registration process through fast-lane registration, accessing and modifying the information related to the owner or items via a secured web portal that provides access to the information inside or outside the secure/private area, etc. It is noticed however that once activation of the link has started, no modification of data related to the owner or item(s) is possible until the transaction or event is done or closed.

The current invention further relates to a system for identifying and handling an owner and at least one item within a secure/private area.

Optionally, the method for identifying and handling (tracing/locating/identifying to receive services) an owner and items according to the present invention comprises the step of securing the item(s) in the secure/private area by monitoring exit from the secure/private area in an intelligent gate that senses item identification means and the linked owner identification means within a predetermined, restrictive distance from the intelligent gate.

Thus, an intelligent gantry or exit door equipped with sensors that sense the presence of item IDs and owner IDs within a predefined restrictive distance (e.g. 5 meter) may prevent items from leaving the secure/private area if not accompanied by the owner. It is noted that the sensors may be integrated in the door/gantry at the exit, or may alternatively be located in the secure/private area, at a short distance from the exit door/gantry, e.g. 3 meters ahead of the exit door/gantry.

An optional feature of the present invention is that the owner identification means is reusable, stores a unique identification number of the owner and automatically identifies itself.

Compared to embodiments of the current invention wherein the owner ID is not reusable, one has the advantage that the same owner ID can be used for several events or transactions. For instance, the same owner ID can be reused during multiple travel events for identifying the traveller and handling (tracing/locating/identifying to receive services) the items and/or children accompanying the traveller. Further, the owner may be identified through a transponder that is programmed to contain a unique number and to automatically identify itself in the neighbourhood of a transceiver or reader that is able to pass the information to the outside world.

The owner identification means according to the current invention may form part of a smartcard and/or may be a Radio Frequency Identification (RFID) transponder. The smartcard can be any plastic card about the size of a credit card, with an embedded microchip that can be loaded with data, e.g. for telephone calling, electronic cash payments, and other applications, and which can be refreshed or updated for additional use.

Indeed, the system may be based on RFID components or any alternative technology offering comparable technical capabilities enabling identification of the owner through a transponder (e.g. an RFID tag kept by the owner on a smartcard), antenna's and readers to communicate with the transponder through radio communication and to pass the tag information to the outside world, e.g. through an interface layer and/or middleware acting as a conduit between the RFID hardware and application software such as inventory, accounts receivable, shipping and logistics systems. The smartcard where the owner ID forms part of can be a card providing access to different services. It might for instance be a combination of a payment card, insurance card and frequent flyer card. As an alternative to RFID, the GPS (Global Positioning System) technology can be used for instance to trace or even locate an owner and associated item(s). Such GPS technology identifies the coordinates of the owner or item at any instant, and typically has a finer granularity in locating the owner/item(s).

The owner ID and item ID(s) may be reusable with adapted information. For instance, flight information or destination information related to a baggage item may change each time the baggage item is taken through an airport transaction.

A further optional feature of the present invention is that the reusable item identification means may store a unique item identification number of the item(s) and automatically or semi-automatically identify themselves.

Thus, similar to the owner ID, the item ID(s) may form part of a transponder that is programmed to contain a unique identification number identifying the item, and that automatically or semi-automatically identifies itself in the neighbourhood of a sensor or reader that reads the unique identification number and is able to pass it onto the outside world.

Yet another optional feature of the current invention is that the reusable item identification means may form part of a bracelet that is securely bound to the item, may form part of a difficult to spoil support for the item, or it may even be integrated in the item.

Eventually, the secure binder may be able to generate an alarm when removed from the item. A secure bracelet or alarm generating bracelet in other words is one example of the secure fixation of the item ID that is fundamental to the current invention. Such a bracelet producing an audible and/or visible alarm when attempting to remove it from the item or when attempting to damage it, prevents fraudulent use of item IDs that are stolen, removed, replaced or interchanged.

In case the item is a baggage, the item ID may for instance be a transponder or chip that is integrated in the suitcase at manufacturing. Such ID will be reused throughout the lifetime of the suitcase and cannot be removed from the case without irrecoverably damaging it. When purchasing the item, the link between the item ID and the owner will be immediately updated. Similarly, children or animals may be tagged with a chip containing a unique ID that is linked to the parent or owner.

Optionally, the reusable item identification means may be a Radio Frequency Identification (RFID) transponder.

The advantages of using RFID technology for the item identification are similar to those mentioned above in relation to the use of RFID technology for the owner identification. Obviously, any similar technology, proprietary or non-proprietary, offering the same capabilities in terms of reusability and automated identification through radio based communication, could serve as well. The item IDs may for instance be based on the EPC standard, e.g. the UHF Generation 2 Standard with read and write capabilities.

The current invention may be extended optionally with services such as accessing and modifying information related to the owner item(s) through a secure web portal, receiving automated messages indicative for the status on the handling (tracing/locating/identifying to receive services) of the items on a GSM phone (if for instance SMS is used as messaging technology) or secure web terminal inside the secure/private area. Other additional services may be offered as well and made accessible through the owner ID, like marketing services, fast registration, logistics handling, etc.

The intelligent gate may be implemented to sense item IDs within a restrictive area, connect to the database for retrieving information on the owner linked to sensed item(s), and sense the owner ID within the restrictive area before doors opening.

This way, it is impossible to take an item outside the secure/private area if the owner is not within the predetermined, restrictive distance to the gate. If for instance the restrictive distance is set equal to 5 meter, both the item and owner must be within 5 meter distance from the intelligent gate in order to be able to pass the gate and leave the secure/private area.

The intelligent gate may comprise an RFID transceiver.

Such an RFID transceiver can be programmed to sense RFID tags worn by the owner or attached to the items within a very restrictive area. RFID tags outside that restrictive area will not be sensed and consequently cannot activate the intelligent gate to open.

The method and system according to the current invention may have numerous applications. Examples are passenger and baggage/child handling (tracing/locating/identifying to receive services) in an airport, identifying and handling (tracing/locating/identifying to receive services) a file or other company belongings like a PC within a company or office area, identifying subscribers and books within a library, identifying artistic works within a museum or house of an art collector, identifying and handling (tracing/locating/identifying to receive services) an article of clothing in a cloakroom, etc.

DETAILED DESCRIPTION OF EMBODIMENT(S)

Figure 1:
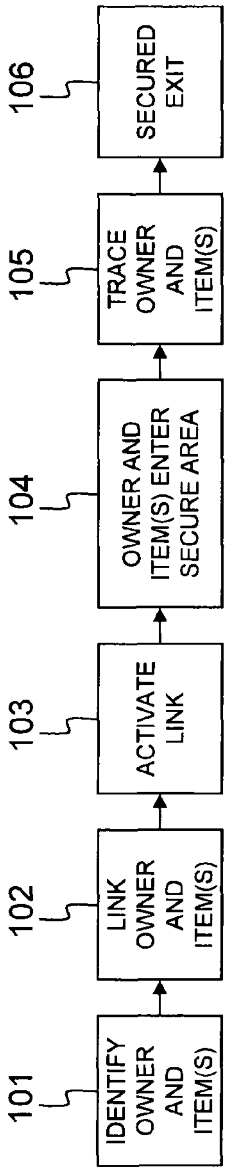
FIG. 1 illustrates a first embodiment of the method to identify and handle (trace/locate/identify to receive services) an owner and item(s) according to the present invention.

FIG. 1 shows the consecutive steps in a first implementation of the method for identifying and handling (tracing/locating/identifying to receive services) within a secure/private area an owner and one or more items belonging to the owner.

In a first step, 101, it is assumed that the owner and the item(s) are identified through reusable identification means. The identification could be based on RFID or any variant technology offering similar capabilities. A first transponder or tag is programmed to uniquely identify the owner. The transponder or tag may be supposed to form part of a master card that is kept by the owner and that combines a number of services like payment card, frequent flyer card, social insurance card, mobile phone SIM card, . . . . The master card can be used by the owner at several occasions, e.g. several travel events, as it is assumed to have read capabilities. Additional transponders or tags are used to identify the item(s) that accompany the owner. Again, the RFID technology or any variant technology with similar capabilities might be used for the item identification. The tags may for instance be based on the EPC standard (e.g. the UHF Generation 2 Standard) and with possibility to use it several times. The transponders identifying the item(s) may be incorporated in the item. A small chip containing the transponder can be incorporated for instance in the object that takes identification. This can be done at manufacturing of the object or the chip may be implanted securely during the lifetime of the object. Alternatively, these transponders are securely fixed to the objects to be identified. Such secure fixation can be realized through an irremovable label stuck on the object or a binder producing an alarm when attempted to be removed or damaged (e.g. an electronic bracelet).

In a second step, 102, the owner and item(s) are linked through a system based on one or more databases. In a system based on two databases for instance, a first database can identify the owner and his personal data, as well as the master card belonging to him. A second database identifying the item(s) stores all item related information as well as a reference to the owner. The two databases are able to communicate thanks to the common information which is the unique identification number of the owner. In a single database, the link between owner and item(s) can be created through a specific object class for the owner, each object of that class having a unique serial number that identifies the owner. For the items, a separate object class will be foreseen and each object of that class will be attached to the serial number of his owner. Another option would be to create only one object class and to start or end the serial number by an identifier for the owner and/or item. Other parts of the serial number will remain. Yet another alternative is just to link the items with their full identifier within a database.

It is noted that the link between the owner and item(s) can be created at generation of the set of cards (in case it is assumed that the master card and item cards are generated together), or the link may be created or updated at purchase of an object wherein the item tag or item card is integrated through the update of a database.

In a third step with reference 103 in FIG. 1, the link between the owner and the item(s) is activated through an automated or computerized, semi-automated registration process for the owner. This registration process might be preceded by a pre-registration outside the classical registration area and/or secure/private area. In case the secure/private area is an airport, pre-registration of the owner/traveller could for instance take place at the hotel, at home, during the shuttle service to the airport, etc. via a secure terminal or web portal that enables the traveller to pre-register also the luggage. In case of pre-registration, the registration can become effective and the link between owner and item(s) can become activated when the owner has access to the secure/private area and confirms his registration (e.g. at a fast registration terminal in the airport). In case no pre-registration is possible, or in case no pre-registration has been performed, the owner shall be able to register himself and the accompanying items at the entrance of the secure/private area.

When the link is activated, the owner and item(s) enter the secure/private area. This is reflected by step 104 in FIG. 1. Depending on the application, the secure/private area can be an airport (for passenger and luggage handling), a library (for subscriber book handling), a cloakroom (for management of clothes belonging to visitors), a company (where files that are shared between employees are traced/located), etc.

In the secure/private area, the item(s) and their owners are traced/located, as is indicated by step 105 in FIG. 1. Handling (tracing/locating/identifying to receive services) capabilities and additional services are offered to the different users in the secure/private area. Thereto, transceivers or ID readers are spread over the secure/private area with antennas able to communicate with the transponders that contain the owner IDs and item IDs. The transceivers are operationally coupled with the database system and feed the latter with information in relation to the events and transactions, status and handling (tracing/locating/identifying to receive services) of the owner and item(s). In case of emergency it will be possible to handle (trace/locate/identifying to receive services) the owner and contact him/her. Automatic messages may be generated by the system and be sent to the owner via SMS or e-mail, e.g. to indicate the transaction status of the item(s). An automated logistics process that makes use of the item IDs may handle the item(s) in the secure/private area.

Lastly, step 106 of FIG. 1 indicates that the item(s are secured in the secure/private area. As a result, it will not be possible to take an object or item out of the secure/private area without being the owner of the item or without being authorized by the owner. Thereto an intelligent gate that is equipped with a tag reader monitors the exit of the secure/private area. Only when both the item ID and the corresponding owner ID are sensed simultaneously within a predefined, restricted distance (e.g. 3 meter, 5 meter, . . . ), the intelligent gate shall open and allow the item to be taken outside the secure/private area. If this is not the case, the intelligent door shall stay closed and an alarm shall be generated to inform security services or customs that there is an issue. Thus, RFID antennas whose coverage area is restricted to e.g. 5 meter (or variant transceivers with similar capabilities) will capture information from the owner cards and the item cards appearing at the exit and make sure that owner and item are going out together.

Figure 2:
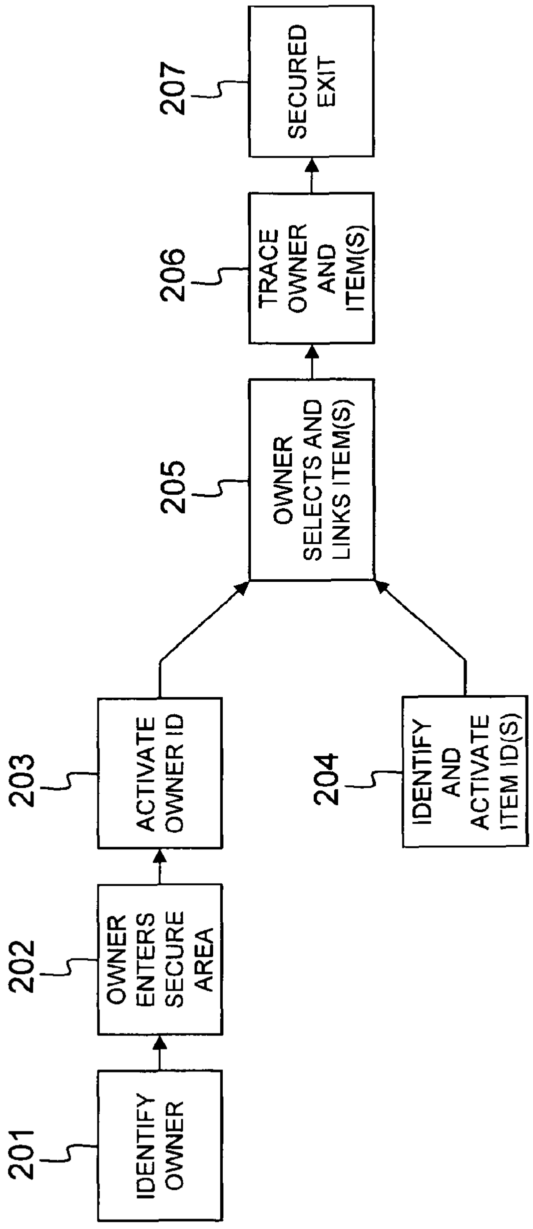
FIG. 2 illustrates a second embodiment of the method to identify and handle (trace/locate/identify to receive services) an owner and item(s) according to the present invention.

FIG. 2 depicts a variant implementation of the owner and item identification and handling (tracing/locating/identifying to receive services) process according to the present invention. This second implementation is suited for applications like a library service where members borrow books that are kept in the library building and that are securely tagged with item IDs.

Again, the owner and item(s) are identified through reusable identification means as is indicated by respective steps 201 and 204. The owner identity gives access to the private or secure area in step 202, and his ID card or chip is activated automatically or semi-automatically upon entering the secure/private area (step 203). In the secure/private area, the owner can make a selection of the products or items and he/she registers his selection in a database via a computer terminal or other device. Through registration of the selection, a link is established between the selected item(s) and the owner. This is indicated by step 205 in FIG. 2. Within the secure/private area, it will be possible to handle (trace/locate/identify to receive services) the owner and the selected item(s) such that owner and item(s) can be traced/located at any instant (step 206). Again, the object(s) cannot be taken outside the secure/private area without being the registered owner. Securing the object(s) or item(s) in step 207 is realised through an intelligent gantry or door at the exit of the secure/private area. This intelligent gantry or door senses the owner ID(s) and item ID(s) within a restricted distance from the exit and opens only when both the item ID(s) and owner ID match.

Figure 3:
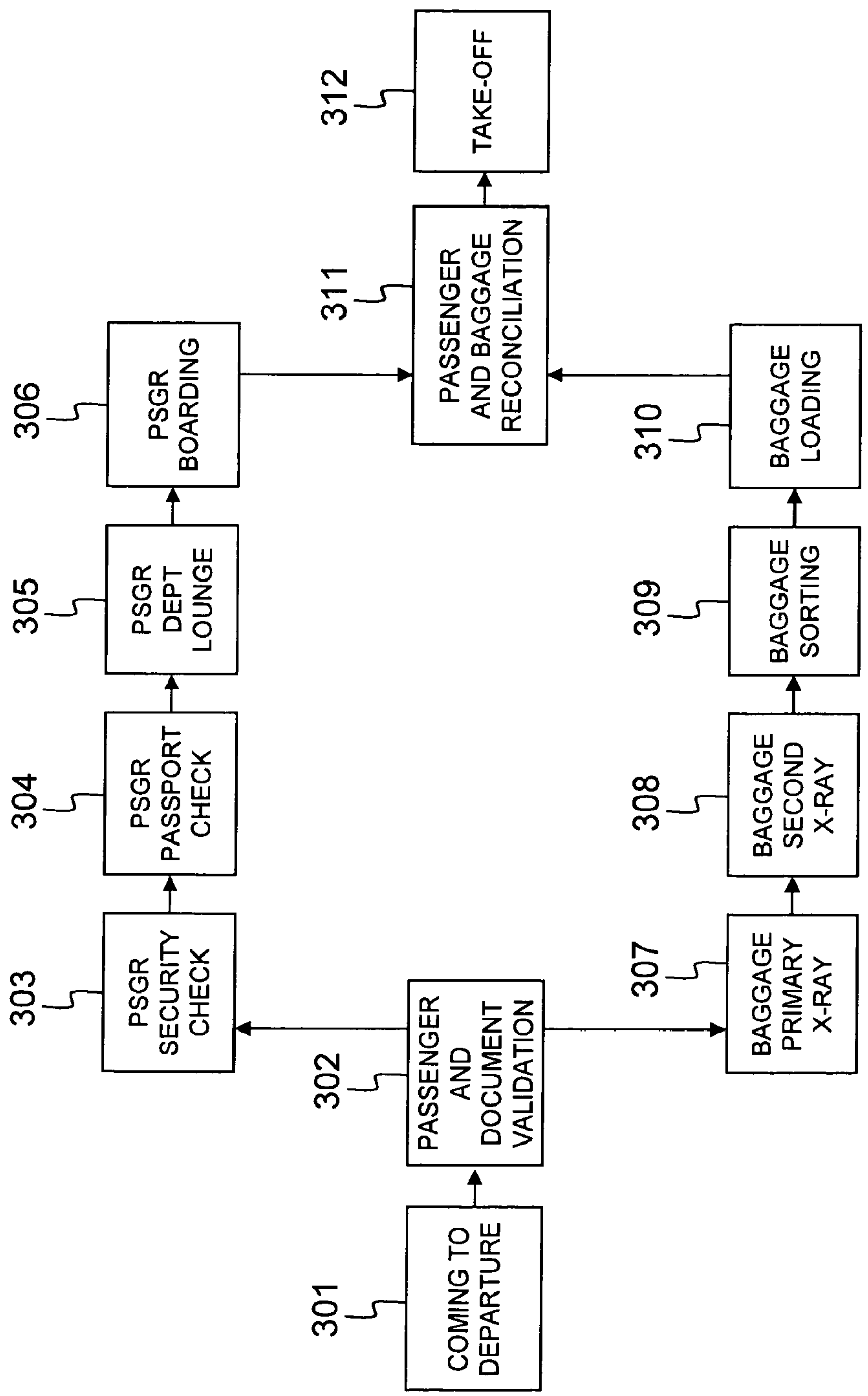
FIG. 3 illustrates a take-off process in the airline/airport industry that takes benefit of the method to identify and handle (trace/locate/identify to receive services) a traveller and baggage(s) according to the present invention.

FIG. 3 illustrates the take-off process for a traveller and his baggage(s) in an airport where the traveller and baggage(s) will be identified and traced/located according to the present invention.

Before joining the airport and coming to department, i.e. step 301 in FIG. 3, a pre-registration process may have taken place outside the airport area. This pre-registration is not mandatory according to the present invention and therefore not shown in FIG. 3. As part of the pre-registration process, the baggage(s) may be securely tagged with RFID cards or chips. Alternatively, an RFID chip may have been integrated into the baggage(s), e.g. at manufacturing thereof. During the pre-registration process, the baggage is checked for instance to respect the norms in weight and size, and the RFID chips that are securely tagged to or integrated in the baggage may already be updated with all travel details by an agent equipped with a dedicated terminal. The agent could be someone from the shuttle service company or the hotel where the traveller resides. Upon arrival at the airport in step 301, the baggage might be stored in a specific room waiting for confirmation that the traveller is fully registered.

In a second step with reference 302 in FIG. 2, the traveller and document validation will take place. This validation consists of a confirmation of the registration of the passenger. The passenger is in the airport and confirms that he/she is going to take the plane. By confirming the registration, the RFID cards of the passenger and all linked RFID cards tagged to the baggage(s) or eventual children accompanying the passenger are automatically activated. By activating the RFID cards attached to the baggage(s), it has become possible to start the baggage handling process, i.e. steps 307 till 310.

The baggage handling process consists of a primary X-ray scan 307, a secondary X-ray scan 308, a baggage sorting procedure 309 to take the baggage(s) to the correct planes and a baggage loading procedure 310 to get the baggage(s) on board. This process is automated thanks to logistics like conveyor belts etc. that are operationally connected to RFID card readers. The RFID card readers are also connected to a central database and feed the database with information indicative for the status of the baggage(s).

Compared to the traditional, state-of-the-art baggage handling process several improvements are achieved as a result of the current invention. The baggage for instance no longer receives a paper label with bar coded travel information. Such label is easily damaged and its readability is light-dependent as a result of which manual interventions are still required to process all baggage(s) whose label cannot be read. Baggage processing based on RFID or similar technology offers the possibility to read faster and in a more accurate way the information than with bar code. Another advantage is that no traditional baggage check-in procedure is required at arrival in the airport. The baggage equipped with RFID tags may benefit from a fast-lane service, offered to all owners of RFID cards. Further, the RFID card enables to handle (trace/locate/identify to receive services) the luggage from the fast-lane check-in desk (or store room) to the plane. The antennas and RFID card readers positioned along the automated luggage handling system will feed the database with the latest status of the baggage(s). The system may be extended with an automatic message generating service. As a result, the passenger can receive messages during the entire baggage handling process 307-310, for instance via SMS on his cell phone, informing him/her on the process status of his/her luggage. The messages may for instance contain information like “process started”, “baggage loaded on the airplane”, etc.

Steps 303 till 306 illustrate the procedure followed by the passenger. The passenger security check in 303 is followed by a passport check in step 304, or vice versa. The passenger thereafter stays in the departure lounge—step 305—and finally moves to the boarding gate to go through the boarding procedure 306. As a member of the RFID service, the passenger may benefit of a faster process for the security check 303 and passport check 304. In the secure/private area, the passenger will be traceable through his/her RFID card, and he/she can benefit from certain advantages like lounge facilities, discounts or promotions in shops, etc. associated with his/her RFID card. Airport or airline personnel can contact the passenger in the secure/private area if needed.

Thanks to the current invention, a huge improvement is realized in the passenger and baggage reconciliation process 311. If a passenger does not show up at the boarding gate, the baggage(s) of that passenger have to be removed from the plane. Thanks to the RFID card, the passenger can be traced/located rapidly and can be contacted by the airline personnel. If it turns out to be impossible for the passenger to board, the baggage(s) can be identified and traced/located easily in the plane thanks to the RFID tags attached thereto. It is no longer needed to identify the right container and thereafter to identify the right baggage(s) in the container as a result of which removal of the baggage(s) from the plane is speed up significantly.

At last, the airplane is ready for take-off in step 312.

Figure 4:
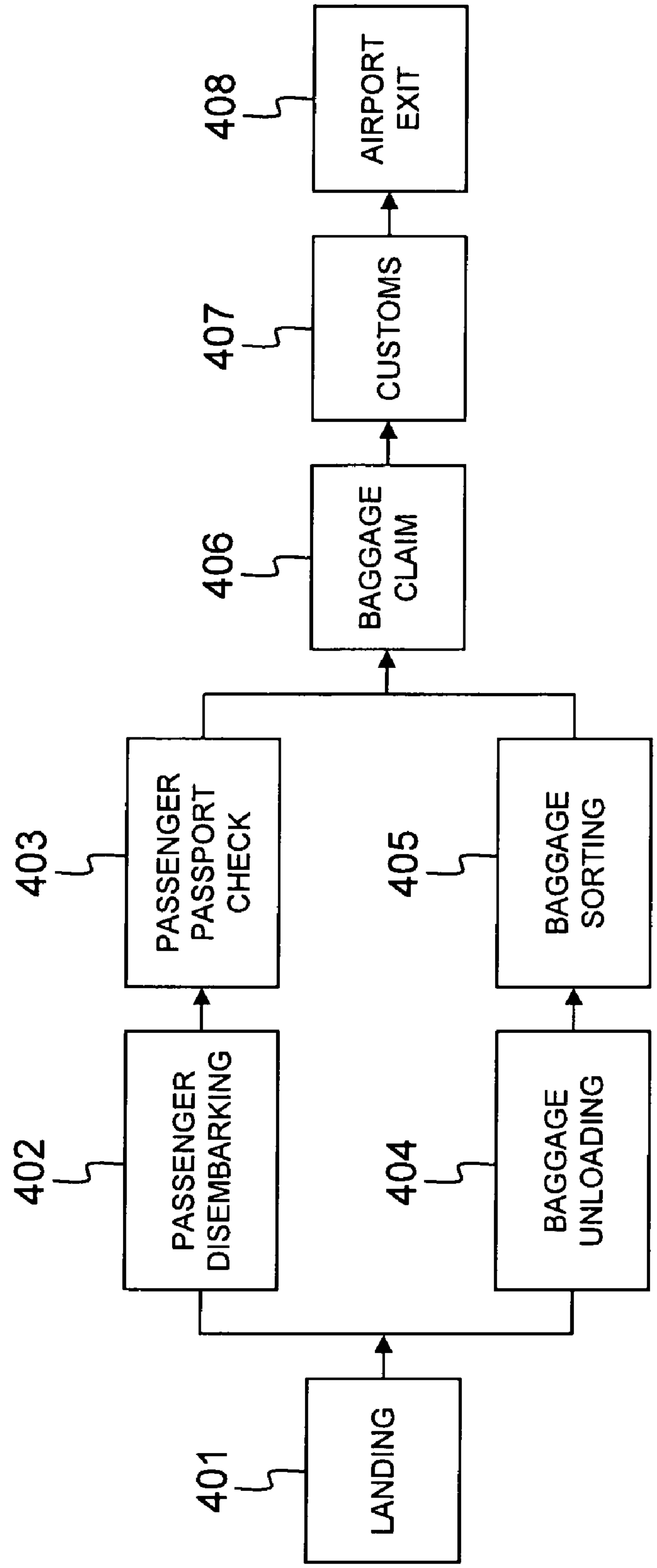
FIG. 4 illustrates a landing process in the airline/airport industry that takes benefit of the method to identify and handle (trace/locate/identify to receive services) a traveller and baggage(s) according to the present invention.

The landing process in an airport where the method and system for identifying and handling (tracing/locating/identifying to receive services) travellers and their luggage according to the current invention are installed, starts with the landing of the airplane, step 401 in FIG. 4.

The passenger process is based upon two steps: passenger disembarking 402 to take the passengers from the airplane to the secure/private airport area, and a passenger passport check 403. Passenger that carry and RFID chip may benefit from a lighter control than others.

The baggage handling process consists of unloading the baggage from the plane in step 404, and sorting the baggage in step 405 in order to take the baggage to the proper baggage claim point. Baggage that is tagged with RFID chips may benefit from a fast-lane process, and similar to the departure process, the traveller may be kept aware of the state of his/her baggage through SMS messages indicating for instance that the baggage is unloaded, that the baggage can be picked up at a certain baggage claim number, etc.

At the baggage claim, i.e. step 406 in FIG. 4, luggage that is equipped with RFID chips/cards can only be taken and passed through the customs by the passenger that is linked to the baggage. Thereto, the customs will be equipped with intelligent gates having RFID antennas integrated. When the RFID antenna detects a baggage RFID tag in its coverage area, the intelligent gate will verify through connection with the central database which passenger is linked to that baggage and the intelligent gate will verify through its RFID antenna if also the RFID card of that passenger is sensed within its limited coverage area. Only when the baggage RFID tag and passenger RFID card match, the baggage can be taken outside and no alarm will be given to the custom office. At the customs, i.e. in step 407, passenger and baggage leave the secure/private area.

At last, passenger and baggage leave the airport in step 408 of FIG. 4.

In case a baggage got lost, the passenger can take advantage of a call centre number and a secured web site accessible through his RFID card in order to register a complaint and get help and support. Searching the luggage will be based on all information stored by the traveller in the database: pictures, baggage description and travel information stored during the check-in process or pre-registration process. The traveller can be updated on the status of his luggage rapidly. The service might for instance be in line with a service level agreement (SLA) in order to find the baggage or to provide the customer with a minimum of comfort. The traveller will be able to check the status of his complaint on the website. On request, he/she may receive on regular basis information related to the search of his baggage.

Figure 5:
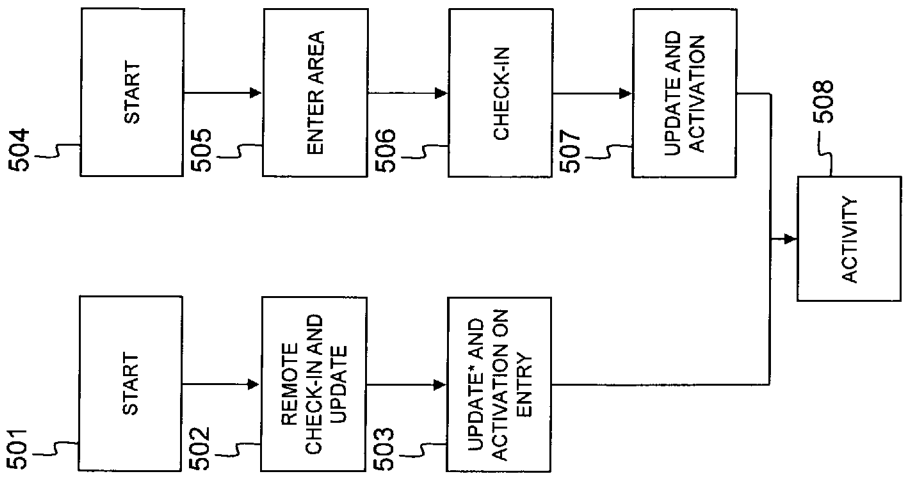
FIG. 5 illustrates an embodiment of a process where the owner/passenger activates the link and starts a handling process for the item and/or for himself with traceability possibility.

FIG. 5 shows an example process for the activation of the link between owner and item(s) and a handling process for the item with traceability options. In the above described passenger/baggage application, this process is related to the activation of the passenger/baggage link following the check-in process. This activation allows to follow and trace the baggage during the handling process and to provide feedback to the passenger (if the passenger wishes so). The activation of this process may also allow tracing the passenger if the passenger approves to do so. It may be interesting for security and/or commercial reasons for instance to trace the passenger within the airport and at least to be able to contact him/her in case of necessity.

As is indicated by steps 501 and 504 in FIG. 5, the process may start in two different ways: either start from a remote location or start directly by entering a specific area, e.g. the airport.

In the first situation, the passenger can go through a remote check-in process by accessing a database from a remote location where he can provide flight information, luggage information, etc., and confirm that he wants activation of the link between himself and the luggage when he enters the airport. The passenger and luggage ID may be updated with the registered information at remote location depending on equipment available at the remote location or when he will enter the airport. This is indicated by step 502 in FIG. 5. When the passenger and his luggage enter the airport in step 503, the passenger and luggage ID may be updated with the registered information (if the update did not take place at the remote location in step 502) and activation of the link will take place automatically.

Alternatively, the passenger may enter the airport area, as is indicated by step 505, and start his check-in process at the airport, as is indicated by step 506 in FIG. 5. The passenger will go through the check-in process autonomously or with assistance and from that moment onwards, activation of the link between passenger and luggage will be up, as indicated by step 507. This also implies that from this moment onwards, the passenger's luggage will be traced and the passenger may receive feedback on the handling process status.

Once the link between passenger and luggage is active, the passenger may go through the different steps indicated in FIG. 3 as from activity 302. This is indicated by step 508 in FIG. 5.

Although the present invention has been illustrated by reference to specific embodiments like the examples in the airport, it will be apparent to people skilled in the art of identification and handling (tracing/locating/identifying to receive services) technologies that various changes and modifications may be made within the spirit and scope of the invention. It is therefore contemplated to cover any and all modifications, variations or equivalents that fall within the spirit and scope of the basic underlying principles disclosed and claimed in this patent application. For example the principle of identifying an owner, re-useably identifying items, linking the owner and items in an automated or semi-automated fashion and securing the items within a secure/private area through an intelligent gate at the exit is not restricted in applicability to airports or transportation in general. As already suggested above, variants of the method based on these principles can be applied in libraries, museums, offices, attraction parks, hotels, etc. Although the above described implementation of the current invention explicitly refers to RFID as technology for identifying the owner and items as well as for radio-based handling (tracing/locating/identifying to receive services) of the owner and items within the secure/private area, the skilled person will appreciate that any variant radio-communication based technology with similar characteristics or any future evolution, modification or enhancement of the current RFID technology can be used instead of RFID. Also certain architectural or implementation choices made here above in relation to the described embodiments, are only given by example. For instance, the coverage area of the intelligent gate positioned at the exit of the secure/private area according to the current invention must not necessarily be restricted to 5 meter, but typically will be chosen depending on the application wherein the invention is used. Obviously, there is a trade-off between increasing the coverage area at the price of a higher risk that an item can be taken outside the secure/private area by a non-authorized person, and reducing the coverage area with a higher risk for inconveniences where either the item ID or the owner ID are not sensed even if they show up together at the exit. To link the item and owner, the examples were given of a single database or two databases, but it will be understood by any skilled person that any arbitrary combination of databases could be configured at software or middleware level to serve the purpose of the current invention which is to establish a link between owner and item(s) which can be activated automatically or semi-automatically upon the owner entering a secure/private area.

The invention claimed is:

1. A method for identifying and handling an owner and at least one personal item of the owner within a secure/private area, said method comprising:

a. identifying said owner through an owner identification system;

b. identifying said at least one personal item of the owner through at least one reusable item identification system;

c. securely fixing said at least one reusable item identification system to respectively said at least one personal item;

d. creating in a database a link between said owner and said at least one personal item;

e. automatically or semi-automatically remotely registering at least said owner prior to entering said secure/private area;

f. automatically or semi-automatically activating by said owner said link between said owner and said at least one personal item;

g. validating confirmation that the at least one owner enters the secure/private area;

h. handling said at least one personal item during a transaction or event in said secure/private area using logistics that are operationally connected to the at least one reusable item identification system;

i. tracking said owner in the secure/private area; and j. facilitating controlling of said at least one personal item during said transaction or event.

2. The method according to claim 1, said method further comprising the step:

securing said at least one personal item in said secure/private area by monitoring exit from said secure/private area through an intelligent gate that is adapted to sense said item identification system and said owner identification system linked thereto within a predetermined, restrictive distance from said intelligent gate.

3. The method according to claim 1, wherein said owner identification system is a reusable system that stores at least an unique owner identification number of said owner and automatically identifies itself.

4. The method according to claim 1, wherein said owner identification system is a Radio Frequency Identification (RFID) transponder that forms part of a smartcard.

5. The method according to claim 3, wherein said owner identification system is reusable with some adapted information.

6. The method according to claim 1, wherein said at least one reusable item identification system is reusable with adapted information.

7. The method according to claim 1, wherein said at least one reusable item identification system stores a unique item identification number of said respective at least one personal item and said at least one personal item identification system automatically or semi-automatically identifies itself.

8. The method according to claim 1, wherein said at least one reusable item identification system either:

a. forms part of at least one bracelet that are securely bound to said at least one personal item; or b. forms part of at least one difficult to spoil support for said at least one personal item; or c. is integrated in said at least one personal item.

9. The method according to claim 1, wherein said at least one reusable item identification system comprises at least one Radio Frequency Identification (RFID) transponder.

10. The method according to claim 1, further comprising the step:

accessing information related to said owner and said at least one personal item through a secure web portal.

11. The method according to claim 1, further comprising the step:

accessing automated messages indicative of the status of handling said at least one personal item through a secure web portal or via Short Message Service (SMS).

12. The method according to claim 2, wherein said intelligent gate senses said item identification system within said restrictive area, connects to said database for retrieving information on said owner linked to said personal item, and senses said owner identification system within said restrictive area before enabling exit from the restricted area.

13. The method according to claim 2, wherein said intelligent gate comprises at least one RFID transceiver.

14. A system for identifying and handling an owner and at least one personal item within a secure/private area, said system comprising:

a. an identification system for identifying said owner;

b. at least one item identification system for identifying said at least one personal item, securely fixed to respectively said at least one personal item;

c. a database for maintaining a link between said owner and said at least one personal item;

d. a registration system that automatically or semi-automatically remotely registers at least said owner prior to entering said secure/private area;

e. an activation system that automatically or semi-automatically activates said link between said owner and said at least one personal item;

f. a validation system that confirms that the at least one owner enters the secure/private area;

g. a handling system that handles said owner and said at least one personal item during transactions or events in said secure/private area, said handling system comprising logistics that are operationally connected to the at least one reusable item identification system;

h. a tracking system for tracking said owner in the secure/private area; and i. a control system that facilitates control of said at least one personal item during said transaction or event.

15. The system according to claim 14, further comprising:

an intelligent gate that secures said at least one personal item in said secure/private area, said intelligent gate being arranged to open said at least one personal item only when said owner identification system is sensed within a predetermined, restrictive distance from said intelligent gate.

16. The method according to claim 1, wherein said handling of at least one personal item during a transaction or event in said secure/private area comprises a baggage handling system in a passenger terminal.

17. The method according to claim 1, wherein said handling of at least one personal item during a transaction or event in said secure/private area comprises a baggage handling system in an airport.

* * * * *